(No Model.) 3 Sheets—Sheet 1.
G. W. HERBERT & S. GUINERY.
SAFETY PIN.
No. 404,003. Patented May 28, 1889.
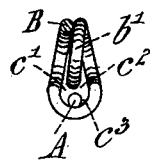
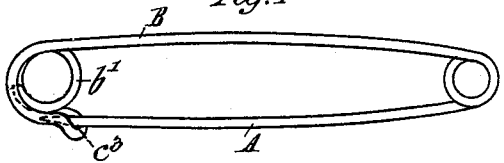
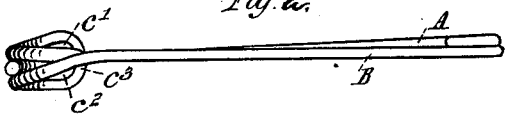
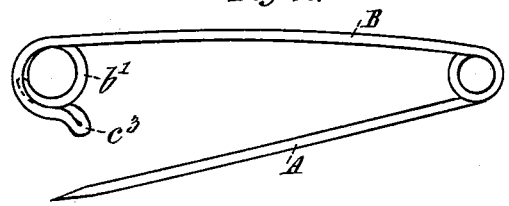
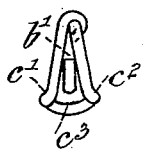
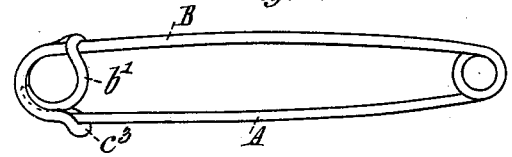
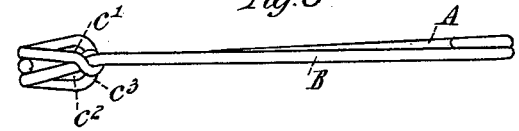
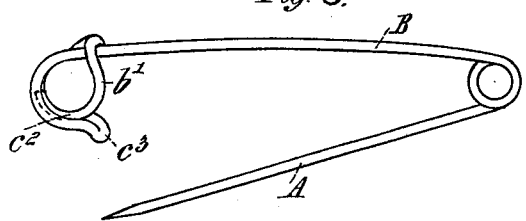
WITNESSES.
Charles Bosworth Ketley
William Charles Batten
INVENTORS.
George William Herbert
Samuel Guinery (No Model.) 3 Sheets—Sheet 2.
G. W. HERBERT & S. GUINERY.
SAFETY PIN.
No. 404,003. Patented May 28, 1889.
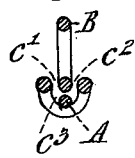
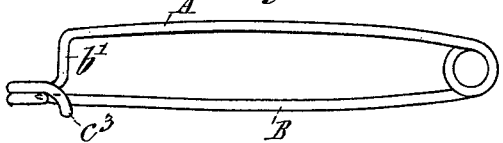
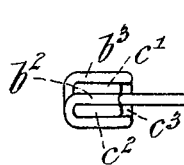
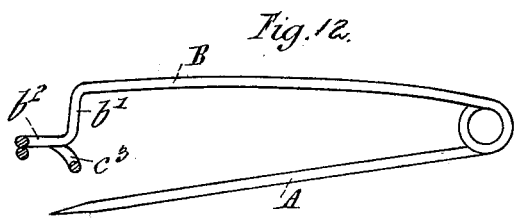
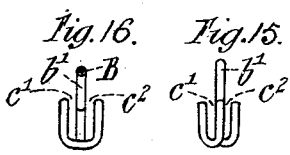
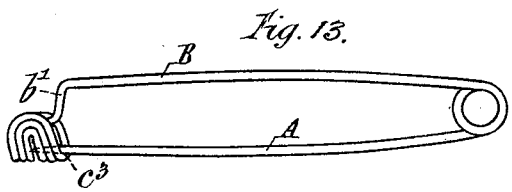
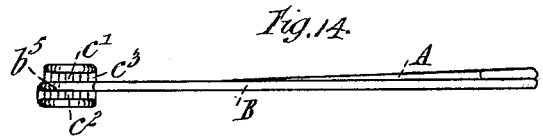
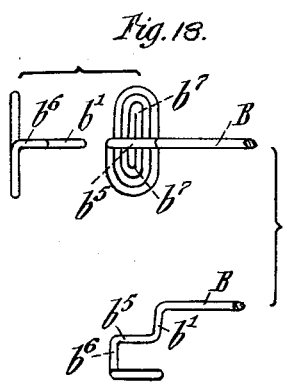
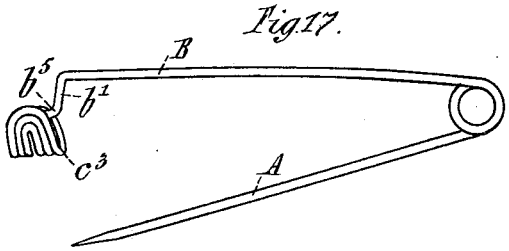
WITNESSES.
Charles Bosworth Ketley
William Charles Batten
INVENTORS.
George William Herbert
Samuel Guinery (No Model.) 3 Sheets—Sheet 3.
G. W. HERBERT & S. GUINERY.
SAFETY PIN.
No. 404,003. Patented May 28, 1889.
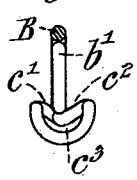
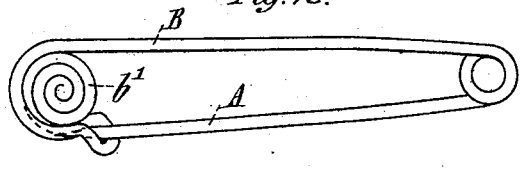
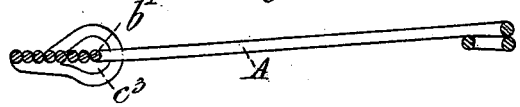
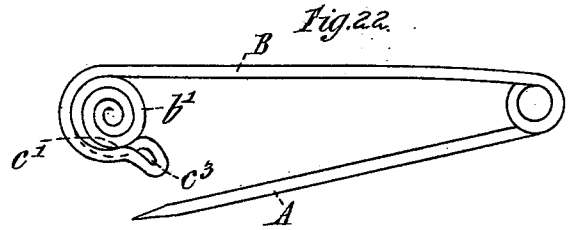
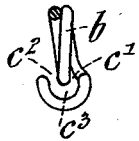
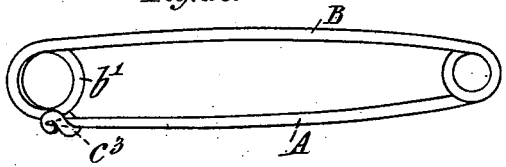
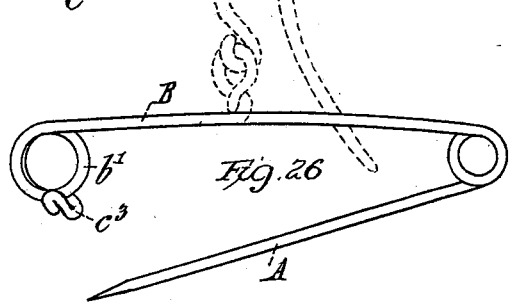
WITNESSES.
Charles Bosworth Ketley
William Charles Batten
INVENTORS.
George William Herbert
Samuel Guinery

UNITED STATES PATENT OFFICE.

GEORGE WILLIAM HERBERT, OF BIRMINGHAM, COUNTY OF WARWICK, AND SAMUEL GUINERY, OF EPSOM, COUNTY OF SURREY, ENGLAND; SAID GUINERY ASSIGNOR TO SAID HERBERT.

SAFETY-PIN.

SPECIFICATION forming part of Letters Patent No. 404,003, dated May 28, 1889.

Application filed February 2, 1888. Serial No. 262,741. (No model.) Patented in England April 9, 1887, No. 5,243.

*To all whom it may concern:*

Be it known that we, GEORGE WILLIAM HERBERT and SAMUEL GUINERY, subjects of Her Majesty the Queen of Great Britain, residing, respectively, at Birmingham, in the county of Warwick, England, and Epsom, in the county of Surrey, England, have invented certain new and useful Improvements in Safety-Pins, of which the following is a specification.

This invention has been patented to us in Great Britain under date April 9, 1887, No. 5,243.

This invention consists of an improved safety-pin constructed substantially as herein described, in which the pointed arm of the pin can be passed into or disengaged from the shield or protecting-arm at either side of the pin; but in fastening the pin the said pointed arm is prevented from being passed straight through the shield on the said protecting-arm by means of a rib or partition therein, which is the chief feature of this invention; and our invention is applicable for use either separately or in combination with a hook for hanging or suspending curtains and other articles.

We will describe our invention by referring to the accompanying drawings, in which—

Figures 1, 2, 3, and 4 illustrate one form of the said invention in which the shield and central partition are formed by bending the wire which forms the pin into a particular shape, as hereinafter set forth. Figs. 5, 6, 7, and 8 illustrate a modification. Figs. 9, 10, 11, and 12 illustrate a second modification. Figs. 13, 14, 15, 16, 17, and 18 illustrate a third modification. Figs. 19, 20, 21, and 22 illustrate a fourth modification. Figs. 23, 24, 25, and 26 illustrate a fifth modification.

Similar letters of reference refer to similar parts throughout the several figures of the drawings.

Referring to Figs. 1 to 4, A is the pointed arm, and B the arm which carries the loop or shield with which the pointed arm engages and by which it is held. The wire of the arm B is bent into a loop, so as to form the side opening, $c'$, for the admittance of the pointed arm A from one side, and then forms the loop $c^3$, for the pointed end of the pin to lie in. It then turns upwardly into another loop to form the other side opening, $c^2$, for the admittance of the arm A, and is coiled round to form the central partition, $b'$.

The pointed arm A may be pressed into place to rest in the loop $c^3$ by passing it from either side through either of the openings $c'$ $c^2$, and the arm is limited in its movement and prevented from passing directly through to the other side of the arm B and loop by the central partition, $b'$.

The example illustrated by Figs. 5, 6, 7, and 8 is very similar to that just described, except that the wire of the arm B is coiled partly around the body of the arm before being coiled to form the partition $b'$, thus adding a little strength thereto.

In the example illustrated by Figs. 9, 10, 11, and 12, as will readily be seen by an examination of the figures, the wire arm B is first bent to form the central partition, $b'$, and then projects forward again at $b^2$. It then turns round backwardly to form one of the side openings, $c^2$, and is then bent down to form the loop $c^3$, after which it is bent forward again at $b^3$ to form the other side opening, $c'$, and the end is finally turned under the front of the pin to secure it.

In the example illustrated by Figs. 13, 14, 15, 16, 17, and 18 the wire of the arms B turns down a short distance, so as to form the central partition, $b'$, and then turns forward at $b^5$, and then downward at $b^6$, and is then formed into the flat coil $b^7$, which is ultimately bent at each side to form the loop $c^3$ and the side openings, $c'$ $c^2$, of the shield.

In the example illustrated by Figs. 19, 20, 21, and 22 the end part of the arm B is bent round in front and the loop $c^3$, and side openings, $c'$ $c^2$, formed similarly to the pin illustrated by Figs. 1, 2, 3, and 4, and the central partition, $b'$, is formed of a flat coil, into which the wire is bent.

Figs. 23, 24, 25, and 26 show a further example, in which the wire of the arm B, after being bent into a circle, one side of which forms the central partition, $b'$, is carried down below the partition and bent into the loop $c^3$, having side openings, $c'$ $c^2$, at each side of the partition $b'$.

It will be evident that our improved safety-pin can be combined with a hook for the purpose of hanging or suspending curtains by attaching or connecting a hook to the arm B in any ordinary manner, as employed with other safety-pins, as shown in dotted lines, Fig. 26.

What I claim is—

1. In combination, the arm A, the arm B, the loop $c^3$, and the partition $b'$, said partition being a coiled continuation of the arm B, substantially as described.

2. In combination, the arm A and the arm B, bent to form first the partition $b'$, and then continued to form the loop $c^3$.

3. In combination, the arms A B, the partition, and the loop $c^3$, said loop being formed of the wire coiled back and forth from side to side of the partition, substantially as described.

In testimony whereof we have each signed in the presence of two subscribing witnesses.

GEORGE WILLIAM HERBERT.
SAMUEL GUINERY.

Witnesses:
CHARLES BOSWORTH KETLEY,
WILLIAM CHARLES BATTEN.